(12) United States Patent
Haruta et al.

(10) Patent No.: US 6,932,882 B2
(45) Date of Patent: Aug. 23, 2005

(54) COATED FILM AND METHOD OF LAMINATING THE SAME

(75) Inventors: Naoya Haruta, Kanagawa-ken (JP); Takeshi Tomiyama, Kanagawa-ken (JP); Toshio Kondo, Kanagawa-ken (JP); Yu Akaki, Kanagawa-ken (JP); Osamu Isozaki, Kanagawa-ken (JP)

(73) Assignee: Kansai Paint Co., LTD, Hyogo-Ken (JP)

( * ) Notice: Subject to any disclaimer, the term of this patent is extended or adjusted under 35 U.S.C. 154(b) by 145 days.

(21) Appl. No.: 10/311,334

(22) PCT Filed: Jul. 11, 2001

(86) PCT No.: PCT/JP01/06019

§ 371 (c)(1),
(2), (4) Date: Dec. 31, 2002

(87) PCT Pub. No.: WO02/04551

PCT Pub. Date: Jan. 17, 2002

(65) Prior Publication Data
US 2003/0148111 A1 Aug. 7, 2003

(30) Foreign Application Priority Data
Jul. 11, 2000 (JP) .................................. 2000-209241

(51) Int. Cl.$^7$ ................................................ C09J 5/00
(52) U.S. Cl. ........................... 156/306.3; 428/423.1; 428/423.3; 428/423.4; 428/423.5; 428/423.7; 428/423.9
(58) Field of Search ................ 156/306.3; 428/423.1, 428/423.3, 423.4, 423.5, 423.7, 423.9, 424.2, 424.4, 424.6, 424.7, 424.8, 220, 413, 31; 264/240, 241, 294, 299

(56) References Cited

U.S. PATENT DOCUMENTS

| | | | |
|---|---|---|---|
| 4,810,540 A | | 3/1989 | Ellison et al. |
| 4,970,108 A | * | 11/1990 | Wank et al. ................. 428/216 |
| 5,368,944 A | * | 11/1994 | Hartung et al. ........... 428/423.1 |
| 6,136,445 A | * | 10/2000 | Gruner et al. ............ 428/423.1 |
| 2002/0114955 A1 | * | 8/2002 | Lamers et al. ............ 428/423.3 |

FOREIGN PATENT DOCUMENTS

| | | |
|---|---|---|
| JP | 8016/81 | 2/1981 |
| JP | 47365/82 | 3/1982 |
| JP | 16675/85 | 1/1985 |
| JP | 221121/88 | 9/1988 |
| JP | 234028/88 | 9/1988 |
| JP | 241338/93 | 5/1993 |
| JP | 5685/95 | 1/1995 |
| JP | 225474/95 | 7/1995 |

OTHER PUBLICATIONS

Japanese Published Patent Application No. 63–123469.
Japanese Published Patent Application No. 2000–104016.
Japanese Published Patent Application No. 5–194766.

* cited by examiner

*Primary Examiner*—Randy Gulakowski
*Assistant Examiner*—Christopher Keehan
(74) *Attorney, Agent, or Firm*—Fisher, Christen & Sabol

(57) ABSTRACT

A multi-layer application film formed by laminating at least two resin films, a top layer film (I) being formed from a crosslinkable resin coating composition (A), an under layer film (II) being formed from a thermoplastic resin (B), showing practically no stickiness per se, and having a tensile elongation at breakage in the range of 50 to 1000%, said multi-layer application film being applied onto a plastic substrate.

2 Claims, No Drawings

COATED FILM AND METHOD OF LAMINATING THE SAME

This is a 371 national stage application of International Application No. PCT/JP01/06019, filed on Jul. 11, 2001, that has priority benefit of Japanese Application No. 00/209241, filed on Jul. 11, 2000.

FIELD OF THE INVENTION

The present invention relates to a novel multi-layer application film and a method of laminating the multi-layer application film.

BACKGROUND ART

A crosslinkable resin coating composition such as a melamine-curing resin coating composition, an isocyanate-curing resin coating composition, an oxidation-curing resin coating composition and the like is coated in the art directly onto a substrate, for example, a metal plate such as a steel plate, aluminum plate, iron plate and the like, wood, inorganic materials other than the above metals, for example, concrete, ceramic, glass and the like, plastics such as polyvinyl chloride, polyethylene terephthalate, polyethylene, nylon and the like, for the purpose of imparting respective functions such as corrosion resistance, appearance, durability, weather resistance, mar resistance and the like to the substrate depending on properties of respective substrates. The above direct coating onto the substrate in the art raises such problems that a selection of an optimum coating method is necessary and troublesome, that generally keeping a uniform coating film thickness is impossible, that coating may easily cause coating drawbacks, that a coating composition may be consumed beyond an amount necessary for coating, that a safe control of a working environment, safety and health is difficult, that difficulty of recovering an old coating film is undesirable from the standpoint of an environmental pollution, and so forth.

Generally, use of a coating composition depending on coating purposes such as a coating method, coating film performances, appearance and the like in the art results various kinds of coating compositions and production of wasteful coating compositions in a large amount, so that unification of various kinds of coating compositions and effective utilization of the coating composition have been demanded in the art.

The present inventors made intensive studies on solving the above problems in the art to find out that the use of a multi-layer application film comprising a top layer formed from a crosslinkable resin coating composition known in the art and an under layer formed from a thermoplastic resin film layer, showing practically no stickiness per se, having a specified elongation and being applied by casting can completely solve the above problems in the art, resulting in accomplishing the present invention.

That is, the present invention relates to:

1. A multi-layer application film formed by laminating at least two resin films, a top layer film (I) being formed from a crosslinkable resin coating composition (A), an under layer film (II) being formed from a thermoplastic resin (B), showing practically no stickiness per se, and having a tensile elongation at breakage in the range of 50 to 1000% as a value measured by the use of a sample of 30 mm in length, 10 mm in width and 0.05 mm in thickness under the conditions of a temperature of −10° C. and a stress rate of 200 mm/min., said multi-layer application film being applied onto a plastic substrate (hereinafter may be referred to as a first invention).

2. A multi-layer application film as in above paragraph 1, wherein the under layer film (II) is formed from a water based urethane resin emulsion.

3. A multi-layer application film as in above paragraph 1 or 2, wherein the water based urethane resin emulsion is prepared by reacting a polyisocyanate compound with an active hydrogen-containing compound reactable with an isocyanate group in the polyisocyanate compound to obtain a hydrophilic group-containing isocyanate-terminating prepolymer, dispersing the prepolymer into water, and by chain-lengthening by use of amines.

4. A method of laminating a multi-layer application film, which method comprises subjecting a multi-layer application film as in any one of above paragraphs 1 to 3 to a thermocompression bonding onto the plastic substrate so that the under layer film (II) may face on the surface of the plastic substrate (hereinafter may be referred to as a second invention).

5. A method of laminating a multi-layer application film, which method comprises simultaneously molding a multi-layer application film as claimed in any one of claims 1 to 3 and a starting material of a plastic substrate so that a under layer film (II) may be formed on the surface of the plastic substrate (hereinafter may be referred to as a third invention).

PREFERRED EMBODIMENT OF THE INVENTION

First Invention:

The first invention is directed to a multi-layer application film formed by laminating at least two resin films, a top layer film (I) being formed from a crosslinkable resin coating composition (A), an under layer film (II) being formed from a thermoplastic resin (B), showing practically no stickiness per se, and having a tensile elongation at break in the range of 50 to 1000% as a value measured by the use of a sample of 30 mm in length, 10 mm in width and 0.01 mm in thickness under the conditions of a temperature of −10° C. and a stress rate of 200 mm/min., said multi-layer application film being applied onto a plastic substrate.

The top layer film (I) used in the first invention is a film of a top layer in a multi-layer film of the multi-layer application film of the present invention and is a film formed from a crosslinkable resin coating composition (A) known in the art.

The crosslinkable resin coating composition (A) may include, for example, an amino-curing resin coating composition, isocyanate-curing resin coating composition, acid•epoxy-curing resin coating composition, hydrolyzable silane-curing resin coating composition, hydroxyl group•epoxy group-curing resin coating composition, hydrazine-curing resin coating composition, oxidative polymerization-curing resin coating composition, photo (thermo)-radical polymerization type resin coating composition, photo(thermo)-cationic polymerization type resin coating composition, and unable resin coating compositions comprising mixtures of at least two of the above coating compositions.

The crosslinkable resin coating composition (A) may optionally contain without particular limitations additives conventionally used in the coating composition, for example, a color pigment, extender pigment, metallic pigment, colored pearl pigment, flow controlling agent, anti-cissing agent, anti-sagging agent, ultraviolet light absorbing agent, antioxidant, ultraviolet light stabilizer, matting agent, polishing agent, preservative, curing promotor, curing catalyst, anti-marring agent, anti-foaming agent, solvent and the like.

The crosslinkable resin coating composition (A) may be in any form, for example, a powder coating composition using the crosslinkable resin, solventless coating composition using a liquid crosslinkable resin including a solventless coating composition prepared by dissolving or dispersing a crosslinkable or non-crosslinkable resin into a radically polymerizable monomer, a water based coating composition prepared by dissolving or dispersing a crosslinkable resin into water, an organic solvent based coating composition prepared by dissolving or dispersing a crosslinkable resin into an organic solvent including a non-water-dispersing coating composition, and the like.

The film (I) has a dry film thickness in the range of 1 to 200 $\mu$m, particularly 20 to 80 $\mu$m. When less than 1 $\mu$m, weather resistance, solvent resistance and sharpness are reduced. When more than 200 $\mu$m, the multi-layer application film may undesirably become fragile.

The film (I) formed from the crosslinkable resin coating composition (A) is such that at least part of the functional group contained in the crosslinkable resin is reacted. A degree of crosslinking of the film (I) is such that the film (I) preferably has a following gel fraction in the range of 50 to 100% by weight.

Determination of Gel Fraction:

A free film was peeled off, followed by introducing the free film into a 300-mesh net stainless steel vessel, extracting by use of an acetone solvent in a Soxhlet extractor at a reflux temperature for 2 hours, and calculating a gel fraction according to the following equation:

Gel fraction (%)=(weight after extraction/weight of a sample before extraction)×100

Amino-Curing Resin Coating Composition:

The above coating composition may include a composition comprising a base resin such as an acrylic resin, vinyl resin, polyester resin and the like having a crosslinkable functional group such as hydroxyl group respectively, and an amino resin as a crosslinking agent.

The acrylic resin and the vinyl resin may include ones obtained by copolymerizing a carboxyl group-containing polymerizable monomer optionally used, particularly in the case of a water based coating composition, a hydroxyl group-containing polymerizable monomer and other polymerizable monomer, and having a hydroxyl value in the range of 10 to 200 mg KOH/g, preferably 20 to 75 mg KOH/g.

The carboxyl group-containing polymerizable monomer is a compound having carboxyl group and a polymerizable unsaturated bond in one molecule, and may include, for example, acrylic acid, methacrylic acid, maleic acid, itaconic acid, crotonic acid and the like. The hydroxyl group-containing polymerizable monomer is a compound having hydroxyl group and polymerizable unsaturated bond in one molecule, and may include, for example, $C_{1-8}$ hydroxyalkyl ester of (meth)acrylic acid such as 2-hydroxyethyl (meth) acrylate, hydroxypropyl (meth)acrylate and the like. The other polymerizable monomer is a compound copolymerizable with the carboxyl group-containing polymerizable monomer and the hydroxyl group-containing polymerizable monomer and having a polymerizable unsaturated bond in one molecule, and may include, for example, $C_{1-24}$ alkyl or cycloalkyl ester of (meth)acrylic acid such as methyl (meth) acrylate, ethyl (meth)acrylate, butyl (meth)acrylate, cyclohexyl (meth)acrylate, 2-ethylhexyl (meth)acrylate, lauryl (meth)acrylate, stearyl (meth)acrylate, decyl acrylate and the like; a functional (meth)acrylamide such as (meth) acryamide, N-methyl (meth)acrylamide, N-ethyl (meth) acrylamide, diacetone acrylamide, N-methylol (meth) acrylamide, N-butoxymethyl acrylamide and the like; a glycidyl group-containing vinyl monomer such as glycidyl (meth)acrylate, glycidyl (meth)acrylamide, allyl glycidyl ether and the like; a vinyl monomer such as styrene, vinyl toluene, vinyl propionate, $\alpha$-methylstyrene, vinyl acetate, (meth)acrylonitrile, vinyl propionate, vinyl pivalate, Veova (trade name, marketed by Shell Japan Ltd.) monomer and the like; and the like. The above acrylic resin or vinyl resin may generally have a number average molecular weight in the range of 5000 to 40000.

The polyester resin may include, for example, a polyester resin prepared by subjecting a polyhydric alcohol and a polybasic acid to an esterification reaction.

The polyhydric alcohol is a compound having at least two alcoholic hydroxyl groups in one molecule, and may include, for example, ethylene glycol, diethylene glycol, propylene glycol, butane diol, pentane diol, 2,2-dimethylpropane diol, glycerin, trimethylol propane, pentaerythritol, and the like. The polybasic acid is a compound having at least two carboxyl groups in one molecule, and may include, for example, phthalic acid, isophthalic acid, tetrahydrophthalic acid, hexahydrophthalic acid, maleic acid, succinic acid, adipic acid, sebacic acid, trimellitic acid, pyromellitic acid, anhydrides thereof, and the like. Further, in the esterification reaction of the above polyhydric alcohol and the polybasic acid, a monohydric alcohol and a glycidyl group-containing monoepoxy compound as a part of the alcohol component may optionally be used, and/or a monobasic acid such as benzoic acid and t-butylbenzoic acid as a part of the acid component may optionally be used. The polyester resin may also include an oil component such as castor oil, tung oil, safflower oil, soy bean oil, linseed oil, tall oil, coconut oil and the like, or polyester resins modified therewith. These polyester resins may generally have a number average molecular weight in the range of 500 to 10000.

The polyester resin may have a hydroxyl value in the range of 10 to 200 mg KOH/g, preferably 25 to 70 mg KOH/g.

The amino resin crosslinking agent is heated to react with the base resin so as to form a three dimensionally cured coating film. The above amino resin may include, for example, ones prepared by condensation or cocondensation of formaldehyde with melamine, benzoguanamine, urea, dicyan diamide and the like, ones obtained by modifying the above amino resin with $C_{1-8}$ alcohols, a carboxyl group-containing amino resin, and the like. These amino resins are obtained by reacting one equivalent of amino group with about 0.5 to about 2 equivalents of formaldehyde according to a known method per se under an alkaline or acidic condition by use of a pH controlling agent such as ammonia, sodium hydroxide, amines and the like.

The organic solvent based amino-curing resin coating composition may be obtained by dissolving or dispersing the above resin into an organic solvent. The organic solvent may include, for example, a hydrocarbon solvent, such as heptane, toluene, xylene, octane, mineral spirit and the like; an ester solvent such as ethyl acetate, n-butyl acetate, isobutyl acetate, methylcellosolve acetate, methylcarbitol acetate, and the like; a ketone solvent such as methyl ethyl ketone, methyl isobutyl ketone, diisobutyl ketone and the like; an alcohol solvent such as methanol, ethanol, isopropanol, n-butanol, sec-butanol, isobutanol and the like; an ether solvent such as n-butyl ether, dioxane, ethylene glycol monomethyl ether, ethylene glycol monoethyl ether and the like, and the like.

The water based amino-curing resin coating composition may be prepared by introducing an acid group into an acrylic resin or polyester resin by use of an acid monomer so as to have an acid value in the range of 5 to 300 mg KOH/g, preferably 5 to 100 mg KOH/g, followed by neutralizing with a neutralizing agent, and dissolving or dispersing into water.

The neutralizing agent may include a basic substance, for example, ammonia, amines such as triethylamine, monoethanol amine, diethanol amine, triethanol amine, dimethylaminoethanol and the like, a hydroxide of an alkali metal such as sodium hydroxide, and the like. Neutralization by use of the above basic substance is followed by adding water or adding water and optionally an organic solvent compatible with water and diluting with water so as to have a suitable solid content.

Further, a water based acrylic resin may be prepared by subjecting the above polymerizable monomer to an emulsion polymerization by use of a dispersion stabilizer such as an ionic or non-ionic low molecular or high molecular surface active substance, water-soluble resin and the like in an aqueous medium according to a method known per se.

A mixing amount as a solid content of the amino resin is in the range of about 10 to 200 parts by weight, preferably 20 to 100 parts by weight per 100 parts by weight of a solid content of the hydroxyl group-containing resin.

Isocyanate-Curing Resin Coating Composition:

The isocyanate-curing resin coating composition may include a composition comprising a base resin such as the above-mentioned acrylic resin, vinyl resin, polyester resin and the like having a crosslinkable functional group respectively and a (blocked) polyisocyanate compound as a crosslinking agent.

The polyisocyanate compound may include a free isocyanate compound and a blocked isocyanate compound. The free isocyanate group-containing polyisocyanate compound may include an organic isocyanate per se, for example, aliphatic diisocyanates such as hexamethylene diisocyanate, trimethyl-hexamethylene diisocyanate and the like; cycloaliphatic diisocyanates such as xylene diisocyanate, isophorone diisocyanate and the like; aromatic diisocyanates such as tolylene diisocyanate, 4,4'-diphenylmethane diisocyanate and the like; adducts of these organic diisocyanates with polyhydric alcohol, low molecular weight polyester resin, water, etc., polymers between respective organic isocyanates, isocyanate•biuret compounds, and the like. Typical examples of commercially available products thereof may include Burnock D-750, D-800, DN-950, DN-970, DN-15-455 (trade names, marketed by Dainippon Ink & Chemicals Inc. respectively); Desmodur L, N, HL and N3390 (trade names, marketed by Sumika Bayel Urethane Co., Ltd. respectively); Takenate D-102, D-202, D-110 and D-123N (trade names, marketed by Takeda Chemical Industries, Ltd. respectively); Coronate EH, L, HL and 203 (trade names, marketed by Nippon Polyurethane Industry Co., Ltd. respectively); Duranate 24A-90CX (trade name, marketed by Asahi Kasei Corporation); and the like. The blocked isocyanate group-containing polyisocyanate compound may include ones obtained by blocking the above free isocyanate group-containing polyisocyanate compound with a known blocking agent such as an oxime, phenol, alcohol, lactam, malonate, mercaptan and the like. Typical examples of commercially available products thereof may include Burnock D-550 (trade name, marketed by Dainippon Ink & Chemicals Inc.), Takenate B-815-N (trade name, marketed by Takeda Chemical Industries, Ltd.), Additol VXL-80(trade name, marketed by Hoechst A. G., Germany), Coronate 2507 (trade name, marketed by Nippon Polyurethane Industry Co., Ltd.), and the like.

A mixing amount of the blocked polyisocyanate compound crosslinking agent may be in such an amount that a coating film may be cured and show satisfactory performances, and preferably may be in such an amount that a hydroxyl group-containing resin/crosslinking agent weight ratio is in the range of 80/20 to 50/50.

The above coating composition may be used as an organic solvent based coating composition which is prepared by dissolving or dispersing the above resin into the above organic solvent. The above coating composition may also be used as a water based coating composition which is prepared by dissolving or dispersing an acrylic resin introduced an acid group by use of an acid monomer and having an acid value in the range of 5 to 300 mg KOH/g, preferably 5 to 100 mg KOH/g, or a resin prepared by neutralizing an acid group in polyester resin with the above neutralizing agent into water.

Acid•Epoxy-Curing Resin Coating Composition:

The acid•epoxy-curing resin coating composition may include, for example, a composition comprising an epoxy resin base material and a polycarboxylic acid compound as a crosslinking agent.

The epoxy resin may include a known epoxy resin having at least one epoxy group in one molecule, for example, a radical polymerization homopolymer of an epoxy group-containing radically polymerizable monomer such as 3,4-epoxycyclohexylmethyl (meth)acrylate, glycidyl (meth)acrylate and the like, a copolymer of the above monomer with other radically polymerizable monomer such as $C_{1-24}$ alkyl or cycloalkyl esters of (meth)acrylic acid, styrene and the like, Epolead GT300 (trade name, marketed by Daicel Chemical Industries, Ltd., trifunctional alicyclic epoxy resin), Epolead GT400 (trade name, marketed by Daicel Chemical Industries, Ltd., tetrafunctional alicyclic epoxy resin), Epolead-EHPE (trade name, marketed by Daicel Chemical Industries, Ltd., trifunctional alicyclic epoxy resin), bisphenol type epoxy resin, novolak type epoxy resin, ε-caprolactam-modified bisphenol type epoxy resin, ones prepared by modifying polyvinyl-cyclohexane diepoxide etc. with polycarboxylic acid, and the like.

The polycarboxylic acid may include, for example, a polycarboxylic acid resin such as an acrylic resin, polyester resin and the like, a polycarboxylic acid compound such as adipic acid, sebacic acid, phthalic acid and the like.

The epoxy resin preferably has a number average molecular weight in the range of about 500 to 20000, particularly 700 to 10000, and preferably has at least two epoxy groups in one molecule.

The acid•epoxy-curing resin coating composition may be used as an organic solvent based coating composition by dissolving or dispersing into the above organic solvent, and may also be used as a water based coating composition by neutralizing carboxyl group with the above neutralizing agent, followed by dispersing into water.

The acid•epoxy-curing resin coating composition may optionally contain the following hydrolyzable silane compound or resin.

Hydrolyzable Silane-Curing Resin Coating Composition:

The above resin coating composition is a coating composition, which contains a hydrolyzable silane group and/or hydroxysilane group-containing compound, that is, which contains a silane compound containing at least two hydrolyzable silane groups or hydroxysilane groups, or containing at least one hydrolyzable silane group and at least one hydroxysilane group in one molecule respectively. The silane compound may include, for example, dialkoxysilanes such as dimethoxydimethylsilane, dimethoxydiethylsilane and the like; trialkoxysilane such as trimethoxymethylsilane, trimethoxyethylsilane and the like; tetraalkoxysilanes such as tetramethoxysilane, tetraethoxysilane and the like; vinylsilanes such as vinyl triethoxysilane, vinyl trimethoxysilane, vinyl tris(methoxyethoxy)-silane, γ-methacryloyloxypropyl trimethoxysilane, 2-styrylethyl trimethoxysilane, and the like; epoxysilanes such as β-(3,4-epoxycyclohexyl)ethyl trimethoxysilane, γ-glycidoxypropyl trimethoxysilane, γ-glycidoxypropylmethyl diethoxysilane and the like; other silanes such as γ-mercaptopropyl trimethoxysilane, γ-mercaptopropylmethyl dimethoxysilane, γ-chloropropyl trimethoxysilane, γ-chloropropylmethyl dimethoxysilane, methyl trichlorosilane, dimethyl dichlorosilane, trimethylchlorosilane and the like; condensation products of the above silane compounds, radical (co)polymers of vinyl silanes, and the like.

The hydrolyzable silane-curing resin coating composition may be used as an organic solvent based coating composition by dissolving or dispersing into the above organic solvent, or as it is or by introducing a carboxyl group into the copolymer by use of the above carboxyl group-containing unsaturated monomer, followed by neutralizing the carboxyl group introduced as above, and by dispersing into water.

Hydroxyl Group•Epoxy Group-Curing Resin Coating Composition:

The above resin coating composition is a coating composition containing, as curing resin components, a hydroxyl group-containing resin and an epoxy resin having at least two or an average, preferably at least three epoxy group-containing functional groups in such a structure that an epoxy group is bonded directly to an alicyclic backbone and/or a bridged alicyclic backbone in one molecule.

The hydroxyl group-containing resin may include, for example, a base resin such as acrylic resin, vinyl resin, polyester resin and the like having respectively a crosslinkable functional group such as hydroxyl group as described in the amino-curing resin coating composition, and further, for example, hydroxyl group introduced by alkanol amine, a caprolactone ring opening product introduced into an epoxide compound a secondary hydroxyl group contained in an epoxy resin such as a bisphenol-epichlorohydrin reaction product, and the like.

An amount of the hydroxyl group is such that a hydroxyl equivalent is in the range of 20 to 5,000, particularly 100 to 1,000, and particularly that a primary hydroxyl equivalent is in the range of 200 to 1,000. The hydroxyl group-containing resin may contain a cationic group, resulting in being made water-dispersible. The cationic group may be formed, for example, by a reaction of epoxy group with a cationizing agent such as an amine compound and the like.

The epoxy group-containing functional group in the epoxy resin component is composed of an alicyclic backbone and/or a bridged alicyclic backbone, and epoxy group. The alicyclic backbone contains a 4-10 membered, preferably 5-6 membered saturated carbon cyclic ring, or a fused ring formed by the condensation of at least two of the above ring. The bridged alicyclic backbone contains such a ring that a bridge of a straight-chain or branched chain $C_{1-6}$, preferably $C_{1-4}$ alkylene group such as —$CH_2$—, —$CH_2CH_2$—, —$CH(CH_3)$—, —$CH(CH_3)CH_2$—, —$C(CH_3)_2$—, —$CH(C_2H_5)CH_2$— and the like, for example, endo-methylene, endo-ethylene and the like, is bonded between two carbon atoms constituting the above monocyclic or polycyclic ring. The epoxy equivalent may usually be in the range of 100 to 2,000, preferably 150 to 500, more preferably 150 to 250. The weight average molecular weight is usually in the range of 400 to 100,000, preferably 700 to 50,000, more preferably 700 to 30,000. The epoxy resin as (B) component and having at least two epoxy group-containing functional groups in one molecule is disclosed in references such as Japanese Patent Publication No. 8016/81, Japanese Patent Application Laid-Open Nos. 47365/82, 166675/85, 221121/88, 234028/88 and the like, and is known per se in the art.

Hydrazine-Curing Resin Coating Composition:

The above coating composition is such a coating composition that a crosslinked structure is formed by a reaction of a polyhydrazide compound containing at least two hydrazide group, —CO—NH—$NH_2$, in one molecule with a carbonyl group-containing compound.

Typical examples of the polyhydrazide compound may include, for example, dihydrazide such as carbodihydrazide and the like, $C_{2-40}$ aliphatic carboxylic acid dihydrazide such as oxalic acid dihydrazide, malonic acid dihydrazide, succinic acid dihydrazide, glutaric acid dihydrazide, adipic acid dihydrazide, sebacic acid dihydrazide, eico acid diacid dihydrazide and the like; aromatic polyhydrazide such as phthalic dihydrazide, terephthalic acid dihydrazide, isophthalic acid dihydrazide, pyromellitic acid dihydrazide, pyromellitic acid trihydrazide, pyromellitic acid tetrahydrazide and the like; monoolefinically unsaturated dihydrazide such as mallic acid dihydrazide, fumaric acid dihydrazide, itaconic acid dihydrazide and the like; other polyhydrazide such as bissemicarbazide, polyacrylic acid polyhydrazide, 1,3-bis(hydrazide/carboethyl)-5-isopropylhydantoin and the like; and the like.

A mixing amount of the polyhydrazide compound is in the range of 0.1 to 2 equivalents, preferably 0.2 to 1 equivalent relative to the carbonyl group contained in the carbonyl group-containing compound.

The carbonyl group-containing compound may include a polymer of the following carbonyl group-containing unsaturated monomer, and optionally a copolymer thereof with other radically polymerizable unsaturated monomer as above mentioned.

The carbonyl group-containing unsaturated monomer is a monomer having at least one keto group or aldehyde group and one radically polymerizable double bond in one molecule, i.e., a polymerizable monoolefinically unsaturated aldehyde compound or keto compound. Typical examples thereof may include diacetone (meth)acrylamide, acrolein, formylstyrol, (meth)acrylamide pivalic aldehyde, diacetone (meth)acrylate, acetonyl (meth)acrylate, 2-hydroxypropyl (meth)acrylate acetyl acetate, vinylalkylketone and the like. Of these, diacetone (meth)acrylamide is preferable.

Oxidative Polymerization-Curing Resin Coating Composition:

The above coating composition is a coating composition containing, as a curing component, an air oxidative polymerization-crosslinking unsaturated fatty acid known in the art. The above coating composition has an iodine value preferably in the range of 35 to 90. The above iodine value is measured by a method in accordance with JIS K-0070. An iodine value less than 30 may show an unsatisfactory oxidative polymerization performance, resulting poor curing properties. An iodine value more than 100 may result a coating composition showing poor storage stability.

The above unsaturated fatty acid may include a natural or synthetic unsaturated fatty acid, for example, an unsaturated fatty acid obtained from a tung oil, linseed oil, castor oil, dehydrated castor oil, safflower oil, tall oil, soy bean oil, palm oil, or the like. These fatty acids may be used alone or in combination.

A coating composition prepared by use of the unsaturated fatty acid may include, for example, an alkyd resin, epoxy-modified alkyd resin and the like.

The alkyd resin may be obtained by mixing the above dry oil or semi-dry oil and at least one of polyhydric alcohols, and keeping at 200 to 250° C., for 10 to 100 minutes with thorough agitation. Optionally, thereafter addition of a polybasic acid, polyhydric alcohol and the like may be followed by reacting at 200 to 250° C. to obtain a low molecular weight alkyd resin.

The polyhydric alcohol may include, for example, ethylene glycol, diethylene glycol, triethylene glycol, propylene glycol, dipropylene glycol, polyethylene glycol or polypropylene glycol having a number average molecular weight in the range of 150 to 6000, or monoalkyl ether thereof, neopentyl glycol, diethylpropane diol, ethylbutylpropane diol, cyclohexane dimethanol, butylene glycol, pentane diol, hexane diol, hydrogenated bisphenol A, ethylene glycol adduct of bisphenol A, trimethylolpropane, trimethylolethane, glycerin, pentaerythritol and the like.

The polybasic acid may include a monovalent or polyvalent carboxylic acid such as phthalic anhydride, isophthalic acid, terephthalic acid, trimellitic anhydride, pyromellitic anhydride, succinic acid, adipic acid, sebacic acid, benzoic acid, alkylbenzoic acid, maleic anhydride, itaconic anhydride, fumaric acid and the like. These may be used alone or in combination.

The epoxy-modified alkyd resin may be obtained from an epoxy resin and a fatty acid by a method known in the art, for example, by reacting the epoxy resin and the fatty acid at 150 to 250° C. by use of a condensation catalyst in a suitable solvent such as toluene, xylene and the like, if necessary, under atmosphere of an inactive gas such as nitrogen gas and the like so as to reach a predetermined acid value.

The epoxy resin may include commercially available epoxy resins, for example, Epikote 828, Epikote 1001, Epikote 1002, Epikote 1004, Epikote 1007, and Epikote 1009 (all marketed by Shell Japan Ltd., bisphenol A type epoxy resin); Epototo YD-128, Epototo YD-01, Epototo YD-012, Epototo YD-014, Epototo YD-017 and Epototo YD-019 (all marketed by Tohto Kasei Co., Ltd., bisphenol A type epoxy resin); Epototo ST-5700 (marketed by Tohto Kasei Co., Ltd., hydrogenated bisphenol A type epoxy resin); Epototo YDF-2004 (marketed by Tohto Kasei Co., Ltd., bisphenol F type epoxy resin); and the like. The above epoxy resins may be used alone or in combination.

An acryl-modified epoxyester resin obtained by reacting the above epoxyester resin with an ethylenically unsaturated monomer may also be used. The ethylenically unsaturated monomer may include styrene, an unsaturated carboxylic acid such as (meth)acrylic acid, maleic anhydride, itaconic acid and the like, (meth)acrylic esters, and mixtures thereof. At least one of the above acrylic monomers essentially contain a carboxyl-group, and at least one of the acrylic monomer may be mixed with styrene to be used.

The oxidative polymerization-curable resin coating composition may include an organic solvent based one, inorganic solvent based one, and water based one.

The drying agent to be used may include any ones without particular limitations, and may include, for example, a metal soap of a cobalt salt, manganese salt, zirconium salt, calcium salt, iron salt, lead salt, etc. on a carrier comprising an aliphatic carboxylic acid such as oleic acid and the like or an alicyclic carboxylic acid such as naphthenic acid and the like; a water based one obtained by adding the above compounds to an anionic emulsifier, cationic emulsifier, nonionic emulsifier and the like; and a tertiary amine such as dimethylaniline, diethylaniline, dimethyl paratoluidine and the like. These may be used alone or in combination.

A mixing amount of the drying agent may not particularly be limited, but preferably in the range of 0.003 to 0.5% by weight. An amount less than 0.003% by weight as a metal content can not provide the above effects. On the other hand, an amount more than 0.5% by weight as a metal content may result a poor water resistance. More preferably, the above mixing amount as a metal content is in the range of 0.05 to 0.4% by weight.

Light (Heat)-Radical Polymerization Resin Coating Composition:

The above coating composition may contain an unsaturated resin capable of taking place a radical polymerization reaction by light or heat, and optionally an ultraviolet light polymerization initiator, peroxidation catalyst, and photosensitive dye.

The unsaturated resin may include a resin obtained by introducing a radically polymerizable unsaturated group into a resin such as urethane resin, acrylic resin, alkyd resin, polyester resin, silicone resin, fluorocarbon resin, spiran resin, polyether resin, epoxy resin and the like. The radically polymerizable unsaturated group may include, for example, vinyl group, (meth)acryloyl group, styryl group, a group derived from maleic acid, and the like.

Typical examples of the unsaturated resin may include, for example, an urethane resin acrylate, acrylic resin acrylate, acrylic resin malate, alkyd resin acrylate, polyester resin acrylate, polyester resin malate, fluorocarbon resin acrylate, spiran resin acrylate, polyether resin acrylate, epoxy resin acrylate and the like.

The ultraviolet light polymerization initiator may include ones known in the art, specifically, for example, an acetophenone based compound such as 4-phenoxydichloroacetophenone, 4-t-butyldichloroacetophenone, 4-t-butyl-trichloroacetophenone, diethoxyacetophenone, 2-hydroxy-2-methyl-1-phenylpropane-1-on, 1-(4-isopropylphenyl)-2-hydroxy-2-methylpropane-1-on, 1-(4-dodecylphenyl)-2-hydroxy-2-methylpropane-1-on, 4-(2-hydroxyphenoxy)-phenyl(2-hydroxy-2-propyl)ketone, 1-hydroxycyclohexylphenylketone, 2-methyl-1-[4-(methylthio)phenyl]-2-morpholinopropanon-1 and the like; thioxanthone based compounds such as thioxanthone, 2-chlorothioxanthone, 2-methylthioxanthone, 2,4-dimethylthioxanthone, isopropylthioxanthone, 2,4-dichlorothioxanthone and the like; a benzoin based compound such as benzoin, benzoin methyl ether and the like; dimethylbenzylketal, acylphosphine oxide, and the like. Of these, the acetophenone based compound is preferable.

A mixing amount of the ultraviolet light polymerization initiator is in the range of about 0.1 to 10 parts by weight per 100 parts by weight of a total amount of the unsaturated resin.

A photopolymerization promotor for promoting a photo-crosslinking reaction by use of the ultraviolet light polymerization initiator may also be added, and may include, for example, tertiary amines such as triethylamine, triethanolamine, 2-dimethylaminoethanol and the like; alkylphosphines such as triphenylphosphine and the like; thiols such as p-thioglycol and the like.

The photosensitizer may include a photosensitive dye known in the art, for example, dyes based on thioxanthene, xanthene, ketone, thiopyrylium salt, base styryl, merocyanine, 3-substituted coumarine, 3,4-substituted coumarine, cyanine, acrydine, thiazine, phenothiazine, anthracene, coronene, benzanthracene, perylene, merocyanine, ketocommarine, fumarine, borate, and the like. These may be used alone or in combination. The borate based photosensitive dyes may include ones disclosed in, for example, Japanese Patent Application Laid-Open Nos. 241338/93, 5685/95 and 225474/95.

Light (Heat)-Cationic Polymerization Resin Coating Composition:

The above coating composition is such that a light-cationically polymerizable compound is subjected to a light irradiation in the presence of a photocationic polymerization initiator and a photosensitizer so as to have a high molecular weight by crosslinking or polymerization reaction.

The light (heat)-cationically polymerizable compound may include, for example, an epoxy compound, styrenes, vinyl compound, vinyl ethers, spiroorthoesters, bicycloorthoesters, spiroorthocarbonates, cyclic ethers, lactones, oxazoline, aziridines, cyclosiloxanes, ketals, cyclic acid anhydrides, lactams, alkoxysilane compounds, aryl dialdehydes, and the like.

The epoxy compound may include any ones known in the art, for example, an aromatic epoxy compound, alicyclic epoxy compound, aliphatic epoxy compound and the like.

The aromatic epoxy compound may include, for example, a monofunctional epoxy compound such as phenylglycidyl ether; polyglycidyl ether of a polyhydric phenol having at least one aromatic ring or alkylene oxide adduct thereof, for example, glycidyl ethers prepared by a reaction of epichlorohydrin with a bisphenol compound such as bisphenol A, tetrabromobisphenol A, bisphenol F, bisphenol S and the like, or with an adduct of the bisphenol compound with an alkylene oxide such as ethylene oxide, propylene oxide, butylene oxide and the like; novolak-based epoxy resins such as phenol•novolak based epoxy resin, cresol•novolak based epoxy resin, bromophenol•novolak based epoxy resin and the like; trisphenolmethane triglycidyl ether, and the like.

The alicyclic epoxy compound may include, for example, 4-vinylcyclohexene monoepoxide, norbornene monoepoxide, limonene monoepoxide, 3,4-epoxycyclohexymethyl-3,4-epoxycyclohexane carboxylate, bis-(3,4-epoxycyclohexylmethyl) adipate, 2-(3,4-epoxycyclohexyl-5,5-spiro-3,4-epoxy)cyclohexanone-metha-dioxane, 2,2-bis[4-(2,3-epoxypropoxy) cyclohexyl] hexafluoropropane, BHPE-3150 (trade name, marketed by Daicel Chemical Industries, Ltd., alicyclic epoxy resin, softening point 71° C.), and the like.

The aliphatic epoxy compound may include, for example, 1,4-butanediol diglycidyl ether, 1,6-hexanediol diglycidyl ether, ethylene glycol diglycidyl ether, ethylene glycol monoglycidyl ether, propylene glycol diglycidyl ether, propylene glycol monoglycidyl ether, polyethylene glycol diglycidyl ether, propylene glycol diglycidyl ether, neopentylglycol diglycidyl ether, neopentylglycol monoglycidyl ether, glycerol diglycidyl ether, glycerol triglycidyl ether, trimethylolpropane diglycidyl ether, trimethylolpropane monoglycidyl ether, trimethylolpropane triglycidyl ether, diglycerol triglycidyl ether, sorbitol tetraglycidyl ether, allylglycidyl ether, 2-ethylhexyl glycidyl ether and the like.

The styrenes may include styrene, α-methylstyrene, p-methylstyrene, p-chloromethylstyrene and the like. The vinyl compound may include N-vinyl arbazole, N-vinyl pyrrolidone and the like.

The vinyl ethers may include, for example, alkyl vinyl ethers such as n-, iso- or t-butyl vinyl ether, cyclohexyl vinyl ether, hydroxybutyl vinyl ether, 1,4-butanediol divinyl ether, ethylene glycol divinyl ether, ethylene glycol monovinyl ether, triethylene glycol divinyl ether, tetraethylene glycol divinyl ether, propylene glycol divinyl ether, propylene glycol monovinyl ether, neopentyl glycol divinyl glycol, neopentyl glycol monovinyl glycol, glycerol divinyl ether, glycerol trivinyl ether, trimethylolpropane, monovinyl ether, trimethylolpropane divinyl ether, trimethylolpropane trivinyl ether, diglycerol trivinyl ether, sorbitol tetravinyl ether, cyclohexanedimethanol divinyl ether, hydroxybutyl vinyl ether, dodecyl vinyl ether, 2,2-bis(4-cyclohexanol) propane divinyl ether, 2,2-bis(4-cyclohexanol) trifluoropropane divinyl ether and the like; alkenyl vinyl ethers such as allyl vinyl ether and the like; alkynyl vinyl ethers such as ethynyl vinyl ether, 1-methyl-2-propenyl vinyl ether and the like; aryl vinyl ethers such as 4-vinyl ether styrene, hydroquinone divinyl ether, phenyl vinyl ether, p-methoxyphenyl vinyl ether, bisphenol A divinyl ether, tetrabromobisphenol A divinyl ether, bisphenol F divinyl ether, phenoxyethylene vinyl ether, p-bromophenoxyethylene vinyl ether and the like; aralkyl divinyl ethers such as 1,4-benzenedimethanol divinyl ether, N-m-chlorophenyldiethanolamine divinyl ether, m-phenylene bis(ethylene glycol) divinyl ether and the like; urethane polyvinyl ether (for example, VEC tomer 2010, trade name, marketed by ALLIED-SIGNAL Co., Ltd.), and the like.

The spiroorthoesters may include, for example, 1,4,6-trioxaspiro (4,4)nonane, 2-methyl-1,4,6-trioxaspiro(4,4) nonane, 1,4,6-trioxaspiro (4,5) decane and the like. The bicycloorthoesters may include, for example, 1-phenyl-4-ethyl-2,6,7-trioxabicyclo (2,2,2) octane, 1-ethyl-4-hydroxymethyl-2,6,7-trioxabicyclo (2,2,2) octane and the like. The spiroorthocarbonates may include cyclic ethers such as 1,5,7,11-tetraoxaspiro (5,5) undecane, 3,9-dibenzyl-1,5,7,11-tetraoxaspiro (5,5) undecane and the like.

The cyclic ethers may include, for example, oxetanes such as oxetane, phenyloxetane and the like; tetrahydrofurans such as tetrahydrofuran, 2-methyltetrahydrofuran and the like; tetrahydrobirans such as tetrahydrobiran, 3-propyltetrahydrobiran and the like; trimethylene oxide, δ-trioxane and the like. The lactones may include β-propiolactone, γ-butylolactone, δ-caprolactone, valerolactone and the like. The oxazolines may include, for example, oxazoline, 2-phenyloxazoline, 2-decyloxazoline and the like.

The aziridines may include aziridine, N-ethylaziridine and the like. The cyclosiloxanes may include hexamethyltrisiloxane, octamethyl cyclosiloxane, triphenyltrimethyl cyclotrisiloxane and the like. The ketals may include 1,3-dioxorane, 1,3-dioxane, 2,2-dimethyl-1,3-dioxane, 2-phenyl-1,3-dioxane, 2,2-dioctyl-1,3-dioxorane and the like. The cyclic acid anhydrides may include phthalic anhydride, maleic anhydride, succinic anhydride and the like. The lactams may include β-propiolactam, γ-butylolactam, δ-caprolactam and the like. The aryl dialdehydes may include 1,2-benzenedicarboxy-aldehyde, 1,2-naphthalenedialdehyde and the like.

A mixing amount of the photosensitizer is preferably in the range of 0.01 to 10 parts by weight, preferably 0.1 to 5 parts by weight per 100 parts by weight of the light-cationically polymerizable compound. A photosensitizer less than 0.01 part by weight may reduce curing properties. On the other hand, a mixing amount more than 10 parts by weight may result a higher cost and reduction in coating film performances such as water resistance and the like.

The light-cationic polymerization initiator may include any ones known in the art, for example, an aryl azonium salt, aryl iodonium salt, aryl sulfonium salt and the like, more specifically, as trade names respectively, Cyracure UVI- 6970, Cyracure UVI-6974, Cyracure UVI-6990, Cyracure UVI-6950 (above trade names, marketed by Union Carbide U.S.A.), Irgacure 7261 (trade name, marketed by Ciba Specialty Chemicals K.K.), SP-150, SP-170 (trade names, marketed by Asahi Denka Kogyo K.K.), CG-24-61 (trade name, marketed by Ciba Specialty Chemicals K.K.), Daicat-II (trade name, marketed by Daicel Chemical Industries, Ltd.), CI-2734, CI-2758, CI-2855 (above trade names, marketed by Nippon Soda Co., Ltd.), PI-2074 (trade name, marketed by Rhone-Poulenc S.A., pentafluorophenylborate-toluyl cumyliodonium salt), FFC 509 (trade name, marketed by 3M Co., Ltd.), BBI-102 (trade name, marketed by Midori Kagaku Co., Ltd.) and the like.

A mixing amount of the light-cationic polymerization initiator is preferably in the range of 0.01 to 20 parts by weight, more preferably 0.1 to 10 parts by weight per 100 parts by weight of the light-cationically polymerizable compound. A light-cationic polymerization initiator less than 0.01 part by weight may reduce curing properties. On the other hand, a mixing amount more than 20 parts by weight may result a higher cost and reduction in coating film performances such as water resistance and the like.

A light source used in the actinic rays may include, for example, respectively ultrahigh pressure, high pressure, moderate pressure, low pressure mercury lamps, chemical lamp, carbon arc lamp, xenone lamp, metal halide lamp, tungsten lamp and the like; lasers having the following oscillating curves respectively, for example, argon laser (488 nm), YAG-SHG laser (532 nm), UV laser (351–364 nm). The heat rays may include, for example, a semiconductor laser (830 nm), YAG laser (1.06 $\mu$m), infrared rays and the like.

In the first invention, between the top layer film (I) and the under layer film (II), the multi-layer application film may optionally have at least one interlayer. Examples of the interlayer may include a plastic film known in the art, for example, films of various kinds of synthetic resins such as, transparent or opaque respectively, polyethylene terephthalate, polyimide resin, polyamide resin, acrylic resin, polycarbonate resin, polypropylene, polyvinyl chloride, ABS and the like; metal film such as aluminum film, metal deposited film and the like; an adhesive layer such as a natural rubber, acrylic resin, ethylene-vinyl acetate copolymer, polyurethane, polyester, silicone rubber, fluororubber, polyvinylbutyral, and the like; a printed layer formed from a composition comprising an organic solvent, coloring agent and a resin component such as polyamide resin, chlorinated rubber, urethane resin, epoxy resin, acrylic resin, polyester resin, silicone resin, vinyl chloride resin, vinyl chloride-vinyl acetate copolymer and the like; crosslinkable or non-crosslinkable resin-colored coating film layer formed from a composition prepared by adding a colorant such as a color pigment, metallic pigment, pearl pigment and the like to the above crosslinkable resin coating composition (A), or to a non-crosslinkable resin component such as polyamide resin, chlorinated rubber, urethane resin, epoxy resin, acrylic resin, polyester resin, silicone resin, vinyl chloride resin, vinyl chloride-vinyl acetate copolymer and the like. These layers may be used in combination.

At least one interlayer comprising the above non-crosslinkable resin-colored coating film layer or the crosslinkable resin-colored coating film layer and formed between the top layer film (I) and the under layer film (II) is explained hereinafter.

The interlayer may include a colored coating film layer formed from a non-crosslinkable or crosslinkable colored base coating composition containing at least one colorant selected from, for example, metallic pigment, (colored) pearl pigment, color pigment and the like; and a first clear coating film layer, which is formed from a non-crosslinkable or crosslinkable first clear coating composition, and which is such that the top layer film (I) is laminated onto the surface of the first clear coating film layer as a second clear coating film layer so that the first clear coating film layer is formed underneath the top layer film (I).

The preparation of a multi-layer application film having at least one interlayer may be carried out by any methods known in the art, for example, a method which comprises coating a coating composition forming a first layer onto a substrate, followed by coating a coating composition forming a second layer onto the surface of a coating film of a non-crosslinked first layer (in the case where the interlayer is non-crosslinkable, non-dried), and crosslinking (in the case where the interlayer is non-crosslinkable, drying) both coating films simultaneously, so called two coats•one bake coating method, a method which comprises coating a coating composition forming a first layer onto a substrate, followed by crosslinking the resulting coating film (in the case where the interlayer is non-crosslinkable, drying), coating a coating composition forming a second layer onto the surface of a crosslinked coating film, and crosslinking a second layer coating film, so called two coats•two bakes coating method, similarly three coats•one bake coating method or three coats•two bakes coating method so as to form a multi-layer film having the interlayer and the top layer film (I).

Specific examples of the preparation of a multi-layer application film having the above interlayer may include, as an example of the two coats•one bake coating method, a method which comprises coating a colored base coating composition onto a release paper such as a polypropylene sheet and the like, followed by optionally predrying, setting, coating a clear coating composition as the crosslinkable resin coating composition (A) forming a top layer film (I) onto the surface of a non-crosslinked (non-dried) coating film, crosslinking both coating films simultaneously (in the case where the colored base coating composition is non-crosslinkable, drying), separating the release paper, coating a thermoplastic resin forming the under layer film (II), for example, a water based urethane resin emulsion onto the surface of a colored base film layer, and drying; a method which comprises coating a clear coating composition as the crosslinkable resin coating composition (A) forming the top layer film (I) onto a release paper, followed by optionally predrying, setting, coating a colored base coating composition, crosslinking (in the case where the colored base coating composition is non-crosslinkable, drying), optionally separating the release paper, coating a thermoplastic resin forming the under layer film (II), for example, a water based urethane resin emulsion onto the surface of a colored base film layer, and drying; and a method which comprises coating a colored base coating composition onto the surface of the under layer film (II), followed by optionally predrying, setting, coating a clear coating composition as the crosslinkable resin coating composition (A) forming the top layer film (I) onto the surface of a non-crosslinked (non-dried) coating film of a resulting coating film, and crosslinking (in the case where the colored base coating composition is non-crosslinkable, drying) both coating films simultaneously.

Specific examples of the preparation of a multi-layer application film having the above interlayer may include, as an example of the two coats•two bakes coating method, a method which comprises coating a colored base coating composition onto a release paper such as a polypropylene sheet, followed by crosslinking a coating film formed from a crosslinkable colored base coating composition, or drying a coating film formed from a non-crosslinkable colored base coating composition, coating a clear coating composition as the crosslinkable resin coating composition (A) forming the top layer film (I) onto the surface of a crosslinked coating film or a dried coating film, crosslinking the coating film formed from the crosslinkable resin coating composition (A), separating the release paper, coating a thermoplastic resin forming the under layer film (II), for example, a water based urethane resin emulsion onto the surface of a colored base film layer, and drying; a method which comprises coating a clear composition as the crosslinkable resin coating composition (A) forming the top layer film (I) onto a release paper, followed by crosslinking, coating a colored base coating composition, crosslinking (drying in the case where the colored base coating composition is non-crosslinkable), optionally separating the release paper, coating a thermoplastic resin forming the under layer film (II), for example, a water based urethane resin emulsion onto the surface of a colored base film layer, and drying; and a method which comprises coating a colored base coating composition onto the surface of the under layer film (II), crosslinking a coating film formed from a crosslinkable colored base coating composition, or drying a coating film formed from a non-crosslinkable colored base coating composition, coating a clear coating composition as the crosslinkable resin coating composition (A) forming the top layer film (I) onto the surface of a crosslinked or dried coating film, and crosslinking a coating film formed from the crosslinkable resin coating composition (A).

In the case where at least one interlayer is optionally formed between the top layer film (I) and the under layer film (II), a film thickness thereof is such that a total film thickness of at least one interlayer is in the range of 10 to 100 μm, particularly 20 to 80 μm.

The under layer film (II) used in the first invention is formed from a thermoplastic resin (B), and has a tensile elongation at break in the range of 50 to 1000% as a value measured by the use of a sample of 30 mm in length, 10 mm in width and 0.050 mm in thickness under the conditions of a temperature of −10° C. and a stress rate of 200 mm/min.

The tensile elongation at breakage is a value measured by the use of an isolated film sample of 30 mm in length, 10 mm in width and 0.050 mm in thickness under the conditions of a measuring temperature of −10° C. and a stress rate of 200 mm/min, and may be measured by use of a measuring machine, for example, a universal tensile testing machine equipped with a temperature controlled bath (trade name, Autograph S-D type, marketed by Shimadzu Corporation).

In the present specification, the tensile elongation at breakage is represented by the following formula: [(length (mm) of the sample at breakage−length (mm) of the sample at starting)/length (mm) of the sample at starting]×100(%).

The under layer film (II) having a tensile elongation at breakage less than 50% show poor follow-up properties to a three-dimensional curved surface and poor application workability. On the other hand, when more than 1000%, too much elongation due to a slight tensile strength may result poor application workability.

The under layer film (II) preferably shows practically no stickiness per se at room temperature (20° C.), and specifically has a glass transition temperature in the range of −40° C. to 80° C., particularly −20° C. to 40° C. A glass transition temperature lower than −40° C. may result high stickiness so as to be difficult for handling. On the other hand, a glass transition temperature higher than 80° C. may reduce elongation, resulting in reducing fabrication properties, etc.

The under layer film (II) may include ones formed from any thermoplastic resin known in the art without particular limitations so long as the above conditions are satisfied, and may preferably include one formed from particularly a water based urethane emulsion from the standpoints of the tensile elongation at breakage, as well as absence of environmental pollution, safety and health due to the use of water as a solvent.

A particularly useful one as the water based urethane resin emulsion may be prepared by many methods. A general preparation method of the water based urethane resin emulsion may include, for example, a method which comprises partly copolymerizing a compound having an ionic functional group (or reactable polar group) on an urethanation reaction to obtain a so-called hydrophilic group-containing isocyanate-terminating prepolymer, followed by dispersing the prepolymer into water, and by chain-lengthening by use of amines.

The hydrophilic group-containing isocyanate-terminating prepolymer to be used may include one prepared by reacting a polyisocyanate compound with an active hydrogen-containing compound reactable with an isocyanate group.

Examples of the above polyisocyanate compound may include aliphatic diisocyanate such as tetramethylene diisocyanate, hexamethylene diisocyanate, trimethylhexamethylene diisocyanate, and the like; alicyclic diisocyanate such as 4,4'-methylene bis(cyclohexylisocyanate), isophorone diisocyanate and the like; aromatic diisocyanate such as xylylene diisocyanate, tolylene diisocyanate, diphenylmethane diisocyanate, polyphenylmethane diisocyanate (hereinafter referred to as polymeric MDI), and the like; and similar compounds thereof, for example, isocyanuric ring type adducts, biuret type adducts and the like. These may be used alone or in combination.

The active hydrogen-containing compound reactable with isocyanate group and used in the preparation of the isocyanate-terminating prepolymer may include a so-called high molecular weight compound having a number average molecular weight in the range of 300 to 10,000, preferably 500 to 5,000, and a so-called low molecular weight compound having a number average molecular weight less than 300.

Typical examples of the high molecular weight compound may include polyester polyol, polyether polyol, polycarbonate polyol, polyacetal polyol, polyacrylate polyol, polyesteramide polyol, polythioether polyol and the like.

The polyester polyol may include, for example, polyesters obtained by a dehydration condensation reaction of various kinds of glycol components such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol having a molecular weight in the range of 300 to 6,000, dipropylene glycol, tripropylene glycol, bishydroxyethoxybenzene, 1,4-cyclohexanediol, 1,4-cyclohexanedimethanol, bisphenol A, hydrogenated bisphenol A, hydroquinone, alkylene oxide adducts thereof and the like with various kinds of acid components such as succinic acid, adipic acid, azelaic acid, sebacic acid, dodecane dicarboxylic acid, maleic anhydride, fumaric acid, 1,3-cyclopentane dicarboxylic acid, 1,4-cyclohexane dicarboxylic acid, terephthalic acid, isophthalic acid, phthalic acid, 1,4-naphthalene dicarboxylic acid, 2,5-naphthalene dicarboxylic acid, 2,6-naphthalene dicarboxylic acid, naphthalic acid, biphenyl dicarboxylic acid, 1,2-bis (phenoxy)ethane-p,p'-dicarboxylic acid, anhydrides or ester-forming derivatives of respective dicarboxylic acids; P-hydroxybenzoic acid, P-(2-hydroxyethoxy) benzoic acid, ester-forming derivatives of respective hydroxycarboxylic acids and the like; polyesters obtained by ring opening polymerization reaction of various kinds of cyclic ester compounds such as ε-caprolactone and the like; and copolymerized polyesters thereof.

The polyether may typically include ones obtained by addition polymerization of at least one of various kinds of compounds having at least two active hydrogen atoms, for example, ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, aconitic sucrose, trimellitic acid, hemimellitic acid, phosphoric acid, diethylene diamine, diethylene triamine, triisopropanolamine, pyrogallol, dihydroxybenzoic acid, hydroxyphthalic acid, 1,2,3-propanetrithiol and the like, by use of a polymerization initiator such as ethylene oxide, propylene oxide, butylene oxide, styrene oxide, epichlorohydrin, tetrahydrofuran, cyclohexylene and the like.

The polycarbonate polyol may typically include a compound obtained by reacting various kinds of glycols such as 1,4-butanediol, 1,6-hexanediol, diethylene glycol and the like with diphenyl carbonate or phosgene.

On the other hand, the low molecular weight compound represents a compound having a molecular weight less than 300, and having at least two active hydrogens in one molecule, and may typically include, for example, various kinds of glycol components used as a starting material of the polyester polyol; various kinds of polyhydroxy compounds such as glycerin, trimethylolethane, trimethylolpropane, sorbitol pentaerythritol and the like; various kinds of amine compounds such as ethylenediamine, 1,6-hexamethylenediamine, piperazine, 2,5-dimethylpiperazine, isophorone diamine, 4,4'-dicyclohexylmethane diamine, 3,3'-dimethyl-4,4'-dicyclohexylmethane diamine, 3,3'-dimethyl-4,4'-dicyclohexylmethane diamine, 1,4-cyclohexane diamine, 1,2-propanediamine, hydrazine, diethylene triamine, triethylene tetramine and the like; and the like.

The method of introducing a hydrophilic group into the hydrophilic group-containing isocyanate-terminating prepolymer may include, for example, a method which comprises copolymerizing at least one hydrophilic group-containing compound containing at least one active hydrogen in one molecule and having carboxyl group, sulfonic acid group, sulfonate group or a repeating unit of ethylene oxide on preparing the prepolymer, and the like.

Typical examples of the hydrophilic group-containing compound may include various kinds of sulfonic acid-containing compounds such as 2-oxyethane sulfonic acid, phenolsulfonic acid, sulfobenzoic acid, sulfosuccinic acid, 5-sulfoisophthalic acid, sulfanylic acid, 1,3-phenylenediamine-4,6-disulfonic acid, 2,4-diaminotoluene-5-sulfonic acid and the like; derivatives thereof, polyester polyols obtained by copolymerizing the same; various kinds of carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, 3,4-diaminobenzoic acid and the like, derivatives thereof, polyester polyols obtained by copolymerizing the same; various kinds of nonionic group-containing compounds such as polyethylene-polyalkylene copolymer containing repeating units of ethylene oxide in an amount of 30% by weight or more, having at least one active hydrogen in the polymer and a molecular weight of 300 to 10,000, and the like, polyester polyether polyol obtained by copolymerizing the same, and the like. These may be used alone or in combination. Particularly preferable hydrophilic group-containing compounds may include, for example, carboxyl group-containing compounds; derivatives thereof, polyester polyols obtained by copolymerizing the same, and the like.

A content of the hydrophilic group in the hydrophilic group-containing isocyanate-terminating prepolymer is 0.01 equivalent or more, preferably 0.01 to 0.2 equivalent per 100 parts by weight of a solid content of a finally obtained polyurethane resin in the case where the hydrophilic group is carboxyl group, sulfonic acid group, sulfonate group or the like, and is 3% by weight or more, preferably 5 to 30% by weight based on a solid content of a finally obtained polyurethane resin in the case of the nonionic group-containing compound.

The hydrophilic group-containing isocyanate-terminating prepolymer may be prepared by any method known in the art, for example, a method which comprises reacting various kinds of polyisocyanate compounds as above described with the active hydrogen-containing compound including the hydrophilic group-containing compound too at an equivalent ratio of isocyanate group to active hydrogen group in the range of 1.1:1 to 3:1, preferably 1.2:1 to 2:1 and at 20 to 120° C., preferably 30 to 100° C.

Typical examples of the polyamine based chain-lengthening agent may include various kinds of diamines such as ethylene diamine, 1,2-propane diamine, 1,6-hexamethylene diamine, piperazine, 2,5-dimethylpiperazine, isophorone diamine, 4,4'-dicyclohexylmethane diamine, 3,3'-dimethyl-4,4'-dicyclohexylmethane diamine, 1,4-cyclohexane diamine and the like; various kinds of polyamines such as diethylene triamine, dipropylene triamine, triethylene tetramine and the like; hydrazines; acid hydrazides; water and the like. These may be used alone or in combination.

The polyamine based chain-lengthening agent is dissolved into water as a dispersant in the preparation of the water based urethane resin emulsion to be used, and is used in such an amount an equivalent ratio to the isocyanate group in the hydrophilic group-containing isocyanate-terminating prepolymer is in the range of 0:1 to 1:1, preferably 0.6:1 to 0.98:1.

A mixing amount of the water may be sufficient in a minimum amount to form an O/W type water emulsion after mixing the prepolymer and an aqueous phase, and preferably in the range of 100 to 1,000% by weight based on a solid content of the polyurethane resin.

In the case where a hydrophilic group in the hydrophilic group-containing isocyanate-terminating prepolymer is carboxyl group, for the purpose of neutralizing the carboxyl group, as a neutralizing agent, various kinds of tertiary amines such as trimethylamine, triethylamine and the like may be added in the range of 0.5:1 to 1.5:1 as an equivalent ratio to the carboxyl group into an aqueous solution of the polyamine based chain-lengthening agent.

The neutralizing agent may be added into the hydrophilic group-containing isocyanate-terminating prepolymer beforehand, but may not be preferable, because the tertiary amine is a strong catalyst of an urethanation reaction so as to take place a side reaction, and the prepolymer may be colored.

The water based urethane resin emulsion is usually subjected to a desolution step prior to completing or after completing a chain-lengthening reaction with the amines.

Examples of the water based urethane resin emulsion, as trade names, may include Superflex 410, Superflex 420, Superflex 600, Superflex 150, Superflex 120, Superflex 107M, Superflex E-2500 (all marketed by Dai-ichi Kogyo Seiyaku Co., Ltd.), and the like.

The water based urethane resin emulsion may optionally contain co-additives. Examples of the co-additives may include dyes, pigments, inorganic fillers, organic modifiers, stabilizers, plasticizers, surface active agents, anti-foaming agents, crosslinking agents, and other additives. The dye may include, for example, a substantive dye, acid dye, basic dye, reactive dye, metal complex dye, and the like. The pigment may include, for example, carbon black, titanium oxide, chromium oxide, zinc oxide, iron oxide, mica, iron blue and the like; organic pigments such as coupling azo based dye, condensation azo based dye, anthraquinone based dye, perylene based dye, quinacridone based dye, thioindigo based dye, dioxazine based dye, phthalocyanine based dye and the like; and the like. The inorganic filler may include, for example, calcium carbonate, silica, talc, glass fiber, potassium titanate whisker and the like. The organic modifier may include, for example, fluorocarbon resin powder, acrylic resin powder, silicone resin powder, polyamide resin powder, urethane resin powder and the like. The stabilizer may include, for example, hindered phenol, hydrazine, phosphorus, benzophenone, benzotriazole, oxazolic acid anilide, hindered amine and the like. These stabilizers are additives used for improving weather resistance and preventing heat resistance degradation.

The plasticizer may include, for example, dibutyl phthalate, dioctyl phthalate and the like. The surface active agent such as a foam-controlling agent may include, for example, a silicone foam-controlling agent such as siloxaneoxyalkylene block copolymer and the like. The antifoaming agent may include, for example, silicone series such as dimethylsiloxane series and the like. The crosslinking agent may include, for example, amino resin such as methylol and/or alkoxylated (methyl-butyl) urea, melamine and the like, epoxy compounds such as bisphenol A type glycidyl ether, hydrogenated bisphenol A type glycidyl ether, ethylene glycol-polyethylene glycol glycidyl ether, glycidyl ether glycerin of glycerin, trimethylol propane, sorbitol, etc., glycidyl ethers obtained by addition of alkylene oxide having 2 to 3 carbon atoms to trimethylol propane, sorbitol etc., and the like, blocked isocyanate series such as adducts synthesized from, for example, one mole of trimethylol propane and 3 moles of hexamethylene diisocyanate, isophorone diisocyanate or toluene diisocyanate; blocked isocyanates obtained by masking water-modified hexamethylene diisocyanate, isophorone diisocyanate, trimer of hexamethylene diisocyanate, etc. with phenol, methyl ethyl ketoxime, ε-caprolactam etc., water based polyisocyanate series such as a reaction product of $C_{2-4}$ polyoxyalkylene polyol with polyisocyanate, and the like. Other additives may include, for example, flame retardant, thixotropic agent, antistatic agent, bactericide and the like.

A mixing amount of the co-additives is such that the dye is in the range of 0 to 50%, preferably 0 to 20%, the pigment, inorganic filler and organic modifier are in the range of 0 to 170%, preferably 0 to 150% respectively, the stabilizer is in the range of 0 to 20%, preferably 0 to 10%, the plasticizer is in the range of 0 to 100%, preferably 0 to 50%, the surface active agent is in the range of 0 to 20%, preferably 0 to 10%, the antifoaming agent and other additives are 0 to 20%, preferably 0 to 10% respectively, the crosslinking agent is in the range of 0 to 50%, preferably 0 to 40% based on the weight of the weight solid content of the resin composition respectively. These co-additives may be prepared by mixing with agitation, or by dispersing and mixing by use of a dispersing-mixing apparatus such as ball mill, kneader, sand grinder, roll mill, flat stone mill and the like. An order of mixing is not limited.

A film thickness from the water based urethane resin emulsion may be varied, but is 5 to 500 μm, preferably 10 to 250 μm. A coating method may include, for example, spray coating, brushing, troweling, roll coating, flow coating, dipping, knife coater, gravure coater, screen printing, reverse-roll coater, and the like. Drying may be carried out at room temperature or by heating at 40 to 270° C. for 10 seconds to 60 minutes.

The multi-layer application film of the present invention is applied onto a coating substrate, for example, various kinds of plastic films such as PVC film, acrylic resin film, polycarbonate film and the like, steel plate, plate material and the like so that the surface of the under layer film (II) may be applied thereonto by a laminate agent for imparting functions such as weather resistance, light resistance, moisture resistance, heat resistance, pollution resistance, water repellent properties, boiling water resistance etc. to the surface of the coating substrate, and consists in a film having functional characteristics and applicable to wide uses such as interior building material, exterior building material, decorative article, packaging, protective film, guide, notice, marking, preservation, and the like.

In the case where fine uneven figures (hereinafter may be referred to as embossing) are formed by embossing fabrication or rubbing fabrication under wet heat conditions on the surface of the multi-layer application film of the present invention, formation of the above embossing may be carried out.

The multi-layer application film of the present invention may be prepared by any methods without particular limitations, specifically, for example, a method which comprises coating a crosslinkable resin coating composition (A) onto a release paper such as polypropylene sheet, followed by crosslinking, optionally separating the release paper, coating a thermoplastic resin (B) such as a water based urethane resin emulsion onto one side of the resulting coating film, drying, and separating the release paper in the case where the release paper is not separated.

The Second Invention:

The second invention relates to a method of laminating the above multi-layer application film, which method comprises subjecting the multi-layer application film to a thermocompression bonding onto the plastic substrate so that the under layer film (II) layer may face on the surface of the plastic substrate. In the above method, the multi-layer application film may be laminated in the same manner as the method known in the art except that the multi-layer application film is used in place of the film known in the art.

The Third Invention:

The third invention relates to a method of laminating the above multi-layer application film, which method comprises simultaneously molding the multi-layer application film and a starting material of a plastic substrate so that the under layer film (II) layer may be formed on the surface of the plastic substrate. In the above method, the multi-layer application film may be laminated in the same manner as the method known in the art except that the multi-layer application film is used in place of the film known in the art.

Explanation is made on fabrication, i.e. in-mold process as a typical example of the multi-layer application film of the present invention.

In the above fabrication process, the multi-layer application film and the plastic starting material are simultaneously subjected to fabrication, preferably injection molding.

The injection molding may be carried out by a method which comprises providing the multi-layer application film inside a mold, followed by injecting and filling a heat-molten plastic material onto the multi-layer application film, cooling, and removing the plastic material out of the mold as a molded product. The multi-layer application film is preferably provided in such a manner that the top layer film (I) layer of the multi-layer application film is brought into contact onto an inner surface of the mold, and that the under layer film (II) layer is brought into contact with the surface of the plastic material. The heat-molten plastic material is injected and filled into the mold so that the heat-molten plastic material is filled on the side of the surface of the under layer film (II) layer and so that the heat-molten plastic material may not be filled between the surface of the mold and the surface of the multi-layer application film.

A size of the multi-layer application film may be a partial or whole size of the inner surface of the mold. In other words, the multi-layer application film may be formed in a partial or whole area of the surface of a plastic molded product.

The plastic material may include any ones known in the art without particular limitations, specifically, for example, polyethylene, polypropylene, polyisobutylene, polybutadiene, polystyrene, polychloroprene, polyvinyl chloride, polyvinyl acetate, nylon, acrylic resin, polycarbonate, cellulose, polyethylene terephthalate, polyacetal, AS resin, ABS resin, glass fiber-reinforced resins prepared by mixing the above resins with glass fiber, and the like.

The plastic material may optionally contain known additives such as colorants, fillers, plasticizers, heat stabilizers and the like.

A fabrication temperature may suitably be determined depending on kinds of the multi-layer application film and plastic material.

The fabrication may also be carried out by, for example, a method which comprises laminating a non-crosslinked multi-layer application film onto a plastic molded product so that the surface of the under layer film (II) layer may be contacted with the external surface of the plastic molded product, followed by simultaneously fabricating the multi-layer application film and the plastic material, and crosslinking the multi-layer application film.

EXAMPLE

The present invention is explained more in detail by Examples and Comparative Examples, in which "part" and "%" represent "part by weight" and "% by weight" respectively. The present invention should not be limited to Examples.

Example 1

Retan PG-80 Metallic (trade name, marketed by Kansai Paint Co., Ltd., isocyanate-curing acrylic resin coating composition) was coated to be a dry film thickness of 10 $\mu$m onto a 150 $\mu$m thick polypropylene sheet (a release paper), followed by drying at 80° C. for 20 minutes, coating Retan PG-80 Quartz Z (trade name, marketed by Kansai Paint Co., Ltd., Clear) so as to be a dry film thickness of 20 $\mu$m, drying at 80° C. for 20 minutes, separating the release paper to obtain a metallic, colored film (a top layer film (I) layer of the present invention).

Thereafter, a water based urethane resin emulsion (trade name, marketed by Dai-ichi Kogyo Seiyaku Co., Ltd., Superflex 410) was coated with a knife coater onto the surface of the above metallic, colored film, followed by drying at 100° C. for 10 minutes to obtain an urethane coating film (corresponding to the under layer film (II) of the present invention) having a coating film thickness of 50 $\mu$m.

The urethane coating film had a tensile elongation at breakage of 170% at −10° C.

The multi-layer application film obtained in Example 1 was provided on an inner side of an injection molding mold capable of being molded in the shape of an automobile bumper so that the clear layer of the colored sheet may be contacted with an inner surface of the mold, followed by injecting under pressure a heat-molten polypropylene at about 230° C. onto the surface of the under layer film (II) of the multi-layer application film by use of an injection molding machine, cooling the mold, removing out of the mold to obtain a polypropylene molded product.

The resulting polypropylene molded product showed good appearance without drawbacks such as wrinkles, blisters, bubbles, reduction in gloss, separation, cracks and the like in both a curved surface and even surface.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 2

A mixture of 75 parts by weight of urethane diacrylate (an oligomer obtained by reacting one mole of polyester diol "phthalic anhydride/neopentyl glycol" with 2 moles of hexamethylene diisocyanate to obtain a terminating isocyanate group-containing polyester, followed by reacting 2 moles of 2-hydroxyethyl acrylate per one mole of the terminating isocyanate group-containing polyester, and having a number average molecular weight of about 3000), 10 parts by weight of methylmethacrylate, 10 parts by weight of butyl acrylate, 5 parts by weight of acetophenone based initiator of 2-methyl-1-[4-(methylthio)phenyl]-2-morpholino-propane-1, and 4 parts by weight of thioxantone based initiator of 2,4-dimethylthioxantone was subjected to screen printing so as to be a film thickness of 10 $\mu$m, and irradiating ultraviolet light under the condition of 500 mj/cm$^2$ to obtain a clear coating film (corresponding to the top layer film (I) layer of the present invention).

Thereafter, Acric #2000 Metallic (trade name, marketed by Kansai Paint Co., Ltd., acryl lacquer coating composition) was coated so as to be a film thickness of 20 $\mu$m by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 $\mu$m thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 3

Into 993 parts of butylcellosolve was dissolved 1900 parts of a bisphenol A type epoxy resin (trade name, Epikote 1004, marketed by Shell Chemicals Japan Ltd.) having an epoxy equivalent of 950, followed by dropping 210 parts of diethanolamine at 80 to 100° C., and keeping at 100° C. for 2 hours to obtain a resin (A-1) having a solid content of 68%, primary hydroxyl group equivalent of 528 and an amine value of 53. To 110 parts (solid content 75 parts) of the resin (A-1) was added 31 parts (solid content 25 parts) of 80% butylcellosolve solution of EHPE 3150 (trade name, marketed by Daicel Chemical Industries, Ltd., epoxy resin using 4-vinylcyclohexene-1-oxide and having a cyclohexane backbone, epoxy equivalent 175–195) to obtain (A-B) mixture.

On the other hand, to 14.8 parts of the above resin (A-1) was added 4.4 parts of 10% formic acid aqueous solution, followed by adding 15 parts of deionized water with agitation, adding 20 parts of titanium white, one part of carbon black and 4 parts of Curezol C11Z (trade name, marketed by Shikoku Chemicals Corporation), dispersing in a ball mill for 24 hours, and adding deionized water to obtain a pigment paste (P-1).

To 141 parts of the (A-B) mixture was added 12.0 parts of 10% formic acid aqueous solution, followed by adding deionized water with agitation to obtain 333 parts of an emulsion having a solid content of 30%.

The emulsion was coated onto the release paper, followed by drying at 140° C. for 20 minutes to obtain a clear coating film (corresponding to the top layer film (I) of the present invention).

Thereafter, Acric #2000 Metallic (trade name, marketed by Kansai Paint Co., Ltd., acryl lacquor coating composition) was coated so as to be a film thickness of 20 μm by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 4

A nitrogen gas-refluxed clean reactor was charged with 300 parts of linseed oil, 250 parts of soy bean oil, 20.5 parts of D•glycerin, 8.1 parts of pentaerythritol and 0.05 part of lithium hydroxide, followed by keeping at 250° C. for one hour with agitation, cooling at 200° C., adding 50 parts of pentaerythritol and 300 parts of phthalic anhydride, heating up to 230° C., reacting for 4 to 5 hours until an acid value may become 30, cooling down to 150° C., adding 27 parts of phthalic anhydride, stirring for 2 hours, adding 465 parts of n-butylcellosolve and 75 parts of triethylamine, and sufficiently stirring to obtain a sticky resin solution having a non-volatile matter content of 65%.

The resin solution was coated onto the above release paper, followed by drying at 80° C. for 20 minutes to obtain a 20 μm thick clear coating film (corresponding to the top layer film (I) of the present invention).

Thereafter, Acric #2000 Metallic (trade name, marketed by Kansai Paint Co., Ltd., acryl lacquor coating composition) was coated so as to be a film thickness of 20 μm by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 5

Soflex 1630 (trade name, marketed by Kansai Paint Co., Ltd., melamine-curing acrylic resin based clear) was coated onto the above release paper, followed by drying at 80° C. for 20 minutes, to obtain a 20 μm thick clear coating film (corresponding to the top layer film (I) of the present invention).

Thereafter, Acric #2000 Metallic (trade name, marketed by Kansai Paint Co., Ltd., acryl lacquor coating composition) was coated so as to be a film thickness of 20 μm by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at –10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 6

KINO #400 (trade name, marketed by Kansai Paint Co., Ltd., acid•epoxy-curing acrylic resin based clear) was coated onto the above release paper, followed by drying at 80° C. for 20 minutes to obtain a 20 μm thick clear coating film (corresponding to the top layer film (I) of the present invention).

Example 7

A nitrogen gas-refluxed clean reactor was charged with 85 parts of toluene, followed by heating at 110° C., dropping for about 3 hours a solution prepared by dissolving 2 parts of 2,2-azobis (2-methylbutylonitrile) as a polymerization initiator into a mixture of 10 parts of styrene, 20 parts of methyl methacrylate, 65 parts of isobutyl methacrylate, and γ-methacryloxypropyltrimethoxysilane, leaving to stand at 110° C. for 2 hours, adding 15 parts of toluene to complete the reaction, and cooling to obtain a sticky hydrolizable silane-curing acrylic resin solution.

The above resin solution had a glass transition temperature of 64° C. according to DSC measurement, and a weight average molecular weight of 6000 by GPC (gel mermission chromatograph) measurement.

A solution prepared by mixing 0.01 part of Neostann U-100 (trade name, marketed by Nittokasei Co., Ltd., organotin compound) with 100 parts of the above resin solution was coated onto the above release paper by use of a knife coater, followed by drying at 80° C. for 20 minutes to obtain a 20 μm thick clear coating film (corresponding to the top layer film (I) of the present invention).

Thereafter, Acric #2000 Metallic (trade name, marketed by Kansai Paint Co., Ltd., acryl lacquer coating composition) was coated so as to be a film thickness of 20 μm by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at –10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 8

A clean reactor was charged with 242 parts of deionized water and 2.4 parts of Newcol 707SP (trade name, marketed by Dai-ichi Kogyo Seiyaku Co., Ltd., solid content 30%), followed by purging nitrogen gas, keeping at 80° C., adding 0.7 part of ammonium persulfate, immediately thereafter dropping the following preemulsion over 3 hours.
Composition of the Preemulsion:

| | |
|---|---|
| deionized water | 352 parts |
| diacetone acrylamide | 33 parts |
| acrylic acid | 3.3 parts |
| styrene | 134 parts |
| methyl methacrylate | 255 parts |
| 2-ethylhexyl acrylate | 147 parts |

-continued

| | |
|---|---|
| n-butyl acrylate | 98 parts |
| Newcol 707SF | 64.5 parts |
| ammonium persulfate | 1.3 parts |

A solution prepared by dissolving 0.7 part of ammonium persulfate into 7 parts of deionized water was dropped over 30 minutes, 30 minutes after the completion of the dropping procedure of the preemulsion, followed by keeping at 80° C. for 2 hours to obtain a hydrazine-curing acrylic emulsion having a non-volatile matter content of 51%.

The hydrazine-curing acrylic emulsion solution was mixed with adipic acid dihydrazide controlled at a pH of 8–9 with ammonia water in an amount of 0.3 equivalent of hydrazide relative to one equivalent of carbonyl group as a crosslinking agent to obtain a solution, followed by coating the solution onto the above release paper by use of a knife coater, drying at 80° C. for 10 minutes to obtain a 20 μm thick clear coating film (corresponding to the top layer film of the present invention).

Thereafter, Acric #2000 Metallic (trade name, marketed by Kansai Paint Co., Ltd., acryl lacquer coating composition) was coated so as to be a film thickness of 20 μm by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 9

A nitrogen gas-refluxed clean reactor was charged with 85 parts of toluene, followed by heating at 110° C., dropping over about 3 hours a solution prepared by dissolving 20 parts of styrene, 20 parts of methyl methacrylate, 30 parts of n-butyl methacrylate, 30 parts of glycidyl methacrylate and 4 parts of 2,2-azobis (2-methylbutylonitrile), leaving to stand at 110° C. for 5 hours, adding 15 parts of acrylic acid, 0.05 part of hydroquinone monomethyl ether and 0.2 part of tetraethylammonium bromide, reacting at 110° C. for 5 hours while introducing air until an acid value becomes zero, adding 35 parts of toluene to complete the reaction, and cooling to obtain a sticky radically curable acrylic resin solution having a non-volatile matter content of 50%.

The above resin solution had a glass transition temperature of 37° C. according to DSC measurement, a weight average molecular weight of 5000, and an average number of unsaturated group in one molecule of 9.0.

A solution prepared by mixing 2 part of Irgacure 1841 (trade name, marketed by Ciba Specialty Chemicals K.K., photoradical polymerization initiator) with 100 parts of the above resin solution was coated onto the above release paper by use of a knife coater, followed by irradiating ultraviolet light under the condition of 1000 mj/cm$^2$ to obtain a 30 μm thick clear coating film (corresponding to the top layer film (I) of the present invention).

Retan PG-80 Metallic (trade name, marketed by Kansai Paint Co., Ltd., isocyanate-curing acrylic resin coating composition) was coated onto the surface of the clear coating film so as to be a film thickness of 20 μm by a spray coating, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 10

A solution prepared by mixing 2 parts of Perbutyl Z (trade name, marketed by NOF Corporation, peroxide compound) with 100 parts of the radically curable acrylic resin solution was coated onto the release paper by use of a knife coater, followed by drying at 120° C. for 10 minutes to obtain a 30 μm thick clear coating film (corresponding to the top layer film (I) of the present invention).

Retan PG-80 Metallic (trade name, marketed by Kansai Paint Co., Ltd., isocyanate-curing acrylic resin coating composition) was coated onto the surface of the clear coating film so as to be a film thickness of 20 μm by a spray coating, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 11

A nitrogen gas-refluxed clean reactor was charged with 85 parts of toluene, followed by heating at 110° C., dropping over about 3 hours a solution prepared by dissolving 2 parts of 2,2-azobis (2-methylbutylonitrile) as a polymerization initiator into a mixed solution of 40 parts of 3,4-epoxycyclohexylmethyl acrylate, 20 parts of methyl methacrylate and 40 parts of n-butyl methacrylate, leaving to stand at 110° C. for 2 hours, adding 15 parts of toluene to complete the reaction, and cooling to obtain a sticky cationically polymerizable acrylic resin solution.

The resin solution had a glass transition temperature of 34° C. according to DSC measurement, a number average molecular weight of 8000 by GPC (gel permission chromatograph) measurement, and a number of epoxy group in one molecule of 17.6.

A solution prepared by mixing 0.5 part of Cyracure UVI-6990 (trade name, marketed by Union Carbide Japan K.K., photo cationic; radical polymerization initiator) into 100 parts of the resin solution was coated onto the above release paper by use of a knife coater, followed by irradiating ultraviolet light under the condition of 1000 mj/cm$^2$ to obtain a 30 μm thick clear coating film (corresponding to the top layer film (I) of the present invention).

Thereafter, Acric #2000 Metallic (trade name, marketed by Kansai Paint Co., Ltd., acryl lacquer coating composition) was coated so as to be a film thickness of 20 μm by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 12

A solution prepared by mixing 2 parts of Sanaid SI-80L (trade name, marketed by NOF Corporation, peroxide compound) into 100 parts of the above cationically curable acrylic resin solution was coated onto the above release paper, followed by drying at 110° C. for 10 minutes to obtain a 20 μm thick clear coating film (corresponding to the top layer film (I) of the present invention).

Thereafter, Acric #2000 Metallic (trade name, marketed by Kansai Paint Co., Ltd., acryl lacquer coating composition) was coated so as to be a film thickness of 20 μm by spray coating onto the surface of the above clear coating film, followed by drying at 80° C. for 10 minutes to obtain a colored coating film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 13

Retan PG-80 Metallic (trade name, marketed by Kansai Paint Co., Ltd., isocyanate-curing acrylic resin coating composition) was coated onto the above release paper so as to be a dry film thickness of 10 μm, followed by drying at 80° C. for 20 minutes, coating a mixed solution of 100 parts of Retan PG-80 Quartz Z base material (trade name, marketed by Kansai Paint Co., Ltd., clear) and 50 parts of Duranate MF-K60X (trade name, marketed by Asahi Kasei Corporation, blocked isocyanate) so as to be a dry film thickness of 20 μm, drying at 80° C. for 10 minutes, and separating the release paper to obtain a metallic colored film.

Next, a water based urethane resin emulsion (Superflex 410, trade name, marketed by Dai-ichi Kogyo Seiyaku Co., Ltd.) was coated by a knife coater onto the surface of the colored coating film, followed by drying at 100° C. for 10 minutes to form a 50 μm thick urethane coating film (corresponding to the under layer film (II) of the present invention), and separating the release paper.

The urethane coating film had a tensile elongation at breakage of 170% at −10° C.

The multi-layer application film obtained in Example 13 was provided on an inner side of an injection molding mold capable of being molded in the shape of an automobile bumper so that the clear layer of the colored sheet may be contacted with an inner surface of the mold, followed by injecting under pressure a heat-molten polypropylene at about 230° C. onto the surface of the under layer film (II) of the multi-layer application film by use of an injection molding machine, cooling the mold, removing out of the mold to obtain a polypropylene molded product.

The clear coating film of the molded product was cured at 120° C. for 30 minutes.

The resulting polypropylene molded product showed good appearance without drawbacks such as wrinkles, blisters, bubbles, reduction in gloss, separation, cracks and the like in both a curved surface and even surface.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Example 14

Retan PG-80 Metallic (trade name, marketed by Kansai Paint Co., Ltd., isocyanate-curing acrylic resin coating composition) was coated onto a 150 μm thick polypropylene sheet as a release paper so as to be a dry film thickness of 10 μm, followed by drying at 80° C. for 20 minutes, coating Retan PG-80 Quartz Z (trade name, marketed by Kansai Paint Co., Ltd., clear) so as to be a dry film thickness of 20 μm, drying at 80° C. for 20 minutes, and separating the release paper to obtain a metallic colored film (corresponding to the top layer film (I) of the present invention).

Thereafter, the following water based urethane resin emulsion (a) was coated onto the surface of the metallic coating film of the colored film, followed by drying at 100° C. for 10 minutes to obtain a 50 μm thick urethane coating film (corresponding to the under layer film (II) of the present invention).

The urethane coating film had a tensile elongation at breakage of 210% at −10° C.

The multi-layer application film obtained in Example 14 was provided on an inner side of an injection molding mold capable of being molded in the shape of an automobile bumper so that the clear layer of the colored sheet may be contacted with an inner surface of the mold, followed by injecting under pressure a heat-molten polypropylene at about 230° C. onto the surface of the under layer film (II) of the multi-layer application film by use of an injection molding machine, cooling the mold, removing out of the mold to obtain a polypropylene molded product.

The resulting polypropylene molded product showed good appearance without drawbacks such as wrinkles, blisters, bubbles, reduction in gloss, separation, cracks and the like in both a curved surface and even surface.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Water Based Urethane Resin Emulsion (a):

A mixture of 350 parts of polyester polyol (butylene adipate, molecular weight 2000), 10.1 parts of trimethylolpropane, 35 parts of polyethylene glycol (molecular weight 600), 35 parts of a PO (propylene oxide)/EO (ethylene oxide) random copolymerized polyether polyol (PO/EO=30/70, molecular weight 3400), and 78.3 parts of 1,4-butanediol was added and dissolved into 400 parts of methyl ethyl ketone, followed by adding 310 parts of isophorone diisocyanate at 50° C., adding 0.05 part of dibutyltin dilaurate, slowly heating up to 75° C., reacting at 75° C. for 60 minutes, adding 0.05 part of dibutyltin dilaurate, further reacting at 75° C. for 200 minutes, cooling down to 50° C. to obtain an urethane prepolymer containing 2.0% (based on the solid content) of a free isocyanate group, adding 80 parts of polyoxyethylene ally phenyl ether type nonionic surface active agent as an adduct of distyrenized phenol with ethylene oxide at 45° C., mixing for 10 minutes, slowly adding 1300 parts of distilled water while stirring at a high speed of 3000 rpm by use of a homomixer, emulsifying at 30° C. for 20 minutes, cooling down to 20° C., adding an ethylenediamine aqueous solution prepared by dissolving 10.5 parts of ethylenediamine into 130 parts of distilled water, further stirring at a speed of 3000 rpm for 60 minutes by use of a homomixer while keeping at 20 to 25° C., and recovering methyl ethyl ketone solvent as used under vacuum by use of an evaporator (bath temperature 40° C.) to obtain a water based urethane resin emulsion (a).

Example 15

Retan PG-80 Metallic (trade name, marketed by Kansai Paint Co., Ltd., isocyanate-curing acrylic resin coating composition) was coated so as to be a dry film thickness of 10 μm onto the above release paper, followed by drying at 80° C. for 20 minutes, coating Retan PG-80 Quartz (trade name, marketed by Kansai Paint Co., Ltd., clear) so as to be a dry film thickness of 20 μm, drying at 80° C. for 20 minutes, and separating the release paper to obtain a metallic colored film (corresponding to the top layer film (I) of the present invention).

Thereafter, the following water based urethane resin emulsion (b) was coated onto the surface of the metallic coating film in the colored film by use of a knife coater, followed by drying at 100° C. for 10 minutes to obtain a 50 μm thick urethane coating film (corresponding to the under layer film (II) of the present invention).

The urethane coating film had a tensile elongation at breakage of 180% at −10° C.

The multi-layer application film obtained in Example 15 was provided on an inner side of an injection molding mold capable of being molded in the shape of an automobile bumper so that the clear layer of the colored sheet may be contacted with an inner surface of the mold, followed by injecting under pressure a heat-molten polypropylene at about 230° C. onto the surface of the under layer film (II) of the multi-layer application film by use of an injection molding machine, cooling the mold, removing out of the mold to obtain a polypropylene molded product.

The resulting polypropylene molded product showed good appearance without drawbacks such as wrinkles, blisters, bubbles, reduction in gloss, separation, cracks and the like in both a curved surface and even surface.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

The polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Water Based Urethane Resin Emulsion (b):

Addition of 7.0 parts of trimethylolpropane and 57.0 parts of 1,4-butanediol to 255 parts of polycarbonate polyol (polycarbonate of 1,6-hexane, molecular weight 2000) was followed by adding 290 parts of methyl ethyl ketone for dissolving, adding 260 parts of isophorone diisocyanate and 0.01 part of dibutyltin dilaurate at 50° C., reacting at 75° C. for 180 minutes while slowly heating to obtain an urethane prepolymer containing 5.0% (based on the solid content) of a free isocyanate group, adding 26.5 parts of dimethylol propionic acid and 120 parts of methyl ethyl ketone, adding 0.07 part of dibutyltin dilaurate, adding 9.9 parts of triethylamine, slowly heating, cooling down to 50° C. to obtain an urethane prepolymer containing 1.99% (based on the solid content) of a free isocyanate group and carboxyl group, adding 9.9 parts of triethylamine at 50° C., neutralizing the remaining carboxyl group, slowly adding 900 parts of distilled water, emulsifying at 25° C. for 20 minutes while stirring at a speed of 3000 rpm by use of a homomixer, adding an ethylenediamine aqueous solution prepared by dissolving 7.8 parts of ethylenediamine into 80 parts of distilled water at 25° C., mixing with agitation at 25° C. for 60 minutes, and recovering methyl ethyl ketone solvent as used under vacuum by use of an evaporator (bath temperature 40° C.) to obtain a water based urethane resin emulsion (b)

Comparative Example 1

A multi-layer application film of Comparative Example 1 was obtained in the same manner as in Example 1 except that a clear coating film-forming method comprising coating Retan PG-80 Metallic (trade name, marketed by Kansai Paint Co., Ltd., isocyanate-curing acrylic resin coating composition) so as to be a dry film thickness of 10 μm, followed by drying at 80° C. for 20 minutes as in Example 1 was replaced by a non-crosslinkable clear coating film-forming method comprising coating Acric #2000 Metallic (trade name, marketed by Kansai Paint Co., Ltd., acryl lacquer coating composition) so as to be a film thickness of 20 μm, followed by drying at 80° C. for 10 minutes.

Fabrication was carried out in the same manner as in Example 1 with the results that the resulting polypropylene molded product had no drawbacks such as wrinkles, blisters, bubbles, reduction in gloss, separation, cracks and the like to show good appearance, in both curved area and even area.

The polypropylene molded product was dipped into a tap water at 40° C. for 20 days with poor results showing drawbacks such as separation of the multi-layer application film from the application area, blisters, reduction in gloss, and the like.

The polypropylene molded product was dipped into gasoline for 5 hours, followed by leaving to stand at room temperature for 2 hours, and evaluating gasoline resistance properties, with the results showing drawbacks such as wrinkles, blisters, reduction in gloss and the like in the application area of the multi-layer application film, and showing poor gasoline resistance.

Comparative Example 2

A multi-layer application film of Comparative Example 2 was obtained by a method which comprises coating Acric #2000 Metallic (trade name, marketed by Kansai Paint Co., Ltd., acryl lacquer coating composition) so as to be a film thickness of 20 μm by spray coating onto a non-rigid polyvinyl chloride film, followed by drying at 80° C. for 10 minutes to obtain a non-crosslinkable clear coating film, coating Retan PG-80 Metallic (trade name, marketed by Kansai Paint Co., Ltd., isocyanate-curing acrylic resin coating composition) so as to be a dry film thickness of 10 μm, and drying at 80° C. for 20 minutes to form a clear coating film.

Fabrication was carried out in the same manner as in Example 1 with the results that the resulting polypropylene molded product had drawbacks such as wrinkles, reduction in gloss, cracks and the like to show poor appearance in both curved area and even area.

The polypropylene molded product was dipped into a tap water at 40° C. for 20 days, followed by examining drawbacks such as separation of the multi-layer application film from the application area, blisters, reduction in gloss, and the like with the results that nothing abnormal was found to be good.

A part showing good appearance of the polypropylene molded product was dipped into gasoline for 5 hours, followed by leaving to stand at room temperature for 2 hours, and evaluating gasoline resistance properties, with the results that drawbacks such as wrinkles, blisters, bubbles, reduction in gloss, separation, cracks and the like in the application area of the multi-layer application film were not found to show good appearance.

Effect of the Invention:

The multi-layer application film of the present invention is such that the heat-curable coating film layer is used as a surface layer, and the urethane resin layer provides an application surface to furnitures, vehicles, building structures and the like. On application of the multi-layer application film, the under layer film (II) shows good performances in flexibility and elongation, and shows no drawbacks such as wrinkles and the like due to the application of the multi-layer application film with good finished appearance. The multi-layer application film provides such effects that when the surface of the applied multi-layer application film is collided with an external material such as gravels, sands and the like, no drawbacks of the coating film such as cracks, separation and the like are provided in spite of high hardness of the coating film, that performances of the coating film with good durability are kept for a long period of time, because the surface of the multi-layer application film show high hardness and the under layer film (II) absorbs energy due to collision from the surface. The surface of the multi-layer application film shows good performances in chemical resistance, pollution resistance, wear resistance due to the formation of the crosslinked coating film.

Since a direct coating of a crosslinkable resin coating composition such as melamine-curing resin coating composition, isocyanate-curing resin coating composition, oxidation-curing resin coating composition and the like onto the substrate is unnecessary, a suitable method can be selected beforehand depending on a purpose of coating, for example, coating method, coating film performances, appearance and the like. The use of the multi-layer application film provides such effects that no coating drawbacks due to coating are not produced, that unnecessary coating composition is not consumed, that working environment on coating and health control on coating can safely be carried out, and that recovery of the coating film is easy, resulting in being desirable from the standpoint of environmental pollution.

The present invention can provide a molded product free of reduction in gloss, cracks, separation etc., because the multi-layer application film shows good elongation, tensile strength, flexibility even in the case of molding fabrication needing high elongation (100% or higher).

INDUSTRIAL APPLICABILITY

The multi-layer application film of the present invention is applied onto a coating substrate, for example, various kinds of plastic films such as PVC film, acrylic resin film, polycarbonate film and the like, steel plate, plate material and the like so that the surface of the under layer film (II) may be applied thereonto by a laminate agent for imparting functions such as weather resistance, light resistance, moisture resistance, heat resistance, pollution resistance, water repellent properties, boiling water resistance etc. to the surface of the coating substrate, and consists in a film having functional characteristics and applicable to wide uses such as interior building material, exterior building material, decorative article, packaging, protective film, guide, notice, marking, preservation, and the like.

What is claimed is:

1. A method of laminating a multi-layer application film, which method comprises subjecting a multi-layer application film formed by laminating at least two resin films, a top layer film (I) being formed from a crosslinkable resin coating composition (A), an under layer film (II) being formed from a thermoplastic resin (B), having a glass transition temperature in the range of $-40°$ C. to $80°$ C. and showing no stickiness per se at room temperature, and having a tensile elongation at breakage in the range of 50 to 1000% as a value measured by the use of a sample of 30 mm in length, 10 mm in width and 0.05 mm in thickness under the conditions of a temperature of $-10°$ C. and a stress rate of 200 mm/min., said under layer film (II) being formed from a water based urethane resin emulsion, said multi-layer application film being applied onto a plastic substrate, to a thermocompression bonding onto the plastic substrate so that the under layer film (II) layer may face on the surface of the plastic substrate.

2. A method of laminating a multi-layer application film as claimed in claim 1, wherein the water based urethane resin emulsion is prepared by reacting a polyisocyanate compound with an active hydrogen-containing compound reactable with an isocyanate group in the polyisocyanate compound to obtain a hydrophilic group-containing isocyanate-terminating prepolymer, dispersing the prepolymer into water, and by chain-lengthening by use of amines.

* * * * *